May 17, 1960

L. F. MOTT 2,936,608

APPARATUS FOR INDICATING THE DENSITY OF
LIQUID FLOWING THROUGH A PIPE

Filed Oct. 17, 1956

INVENTOR
LAWRENCE FARNELL MOTT
BY
Moses, Nolte, & Nolte
ATTORNEYS

May 17, 1960

L. F. MOTT 2,936,608

APPARATUS FOR INDICATING THE DENSITY OF LIQUID FLOWING THROUGH A PIPE

Filed Oct. 17, 1956

Inventor
Lawrence Farnell Mott
By Moses, Nolte & Nolte
Attorneys

United States Patent Office 2,936,608
Patented May 17, 1960

2,936,608

APPARATUS FOR INDICATING THE DENSITY OF LIQUID FLOWING THROUGH A PIPE

Lawrence Farnell Mott, Godsall, Wolverhampton, England, assignor to H. M. Hobson Limited, London, England, a company of Great Britain Application October 17, 1956, Serial No. 616,432

Claims priority, application Great Britain November 7, 1955

8 Claims. (Cl. 73—32)

The invention provides a centrifugal density monitor for indicating changes in density of a flowing liquid, comprising a casing having an inlet and an outlet for the liquid, a driving shaft extending into the casing, means for rotating the driving shaft, a balanced system of masses mounted for rotation with the driving shaft and comprising a number of units, each of which is independently free to pivot in relation to the driving shaft so as to assume a level determined by the density of the liquid flowing through the casing, an indicating device for indicating common changes in inclination to the driving shaft of the units of the mass system and a shield in the casing constraining the liquid surrounding the mass system to rotate therewith.

In the preferred form of density monitor each unit of the balanced system of masses is a composite mass pivoted for movement in relation to the driving shaft about an axis normal to the axis of the shaft, all the pivots being disposed in a common plane normal to the shaft and being tangential to a common circle and each composite mass comprising a cranked lever carrying on one arm a weight of low density and on the other arm a weight of high density, the arms carrying the lighter weights extending, when the driving member is rotating, in the same direction as and substantially parallel to the shaft and the other arms extending, when the driving member is rotating, away from the shaft at an angle of approximately 45°.

The density monitor according to the invention is primarily intended for measuring changes in density of the fuel supplied to the engine of an airborne vehicle. The driving shaft may be rotated by any convenient means, e.g. an electric motor, directly from the engine of the vehicle, a propeller driven by the airstream past the vehicle, or by a propeller driven by the flow of liquid through the engine fuel system.

The speed of revolution does not affect the relationship between the density and the angular position of the cranked levers, but it should be sufficiently high to prevent extraneous accelerations affecting this relationship, particularly acceleration applied in the direction of the shaft axis. The output force available per unit of density changes varies as the square of the speed of rotation; therefore the accuracy is enhanced at high speeds.

Accordingly, in use of the monitor, the speed of rotation of the driving shaft should not be allowed to fall below a minimum value giving the required degree of accuracy, which minimum value will depend upon the geometry of the monitor in any given case.

The collective movement of the cranked levers in response to changes in density of the liquid may be transmitted to an axially slidable rod arranged coaxially with respect to the driving shaft and serving to actuate an indicating mechanism or an electrical potentiometer external to the casing. In the latter case the potentiometer will be associated with a slider, the slider and potentiometer receiving relative movement to generate voltage signals representative of the changes in density of the liquid.

Alternatively the movements of the cranked levers may operate a potentiometer mounted on the rotary assembly inside the casing, the electrical signals from the potentiometer being conveyed to the exterior of the casing through slip rings and brushes.

The centrifugal density monitor according to the invention may be used for the purpose of modifying the indication of a volumetric flowmeter (e.g. that described in British specification No. 752,496) to convert the indication thereof to gravimetric values.

It may also be used for the purpose of modifying the delivery of fuel metering devices for heat engines which normally meter fuel on a volumetric basis in response to input criteria, and which it is desired should meter on a gravimetric basis. The monitor may be arranged in this case to operate a correcting mechanism such as a tapered needle in a jet, or to adjust the effective stroke of a reciprocating plunger. The movement provided by the monitor may be taken directly to the correcting mechanism or through a servo motor.

Two alternative forms of centrifugal density monitor according to the invention will now be described in more detail, by way of example, with reference to the accompanying diagrammatic drawings, in which:

Fig. 4 is a diagram explanatory of the operation of the apparatus.

Like reference numerals indicate like parts throughout the figures.

Figure 1:
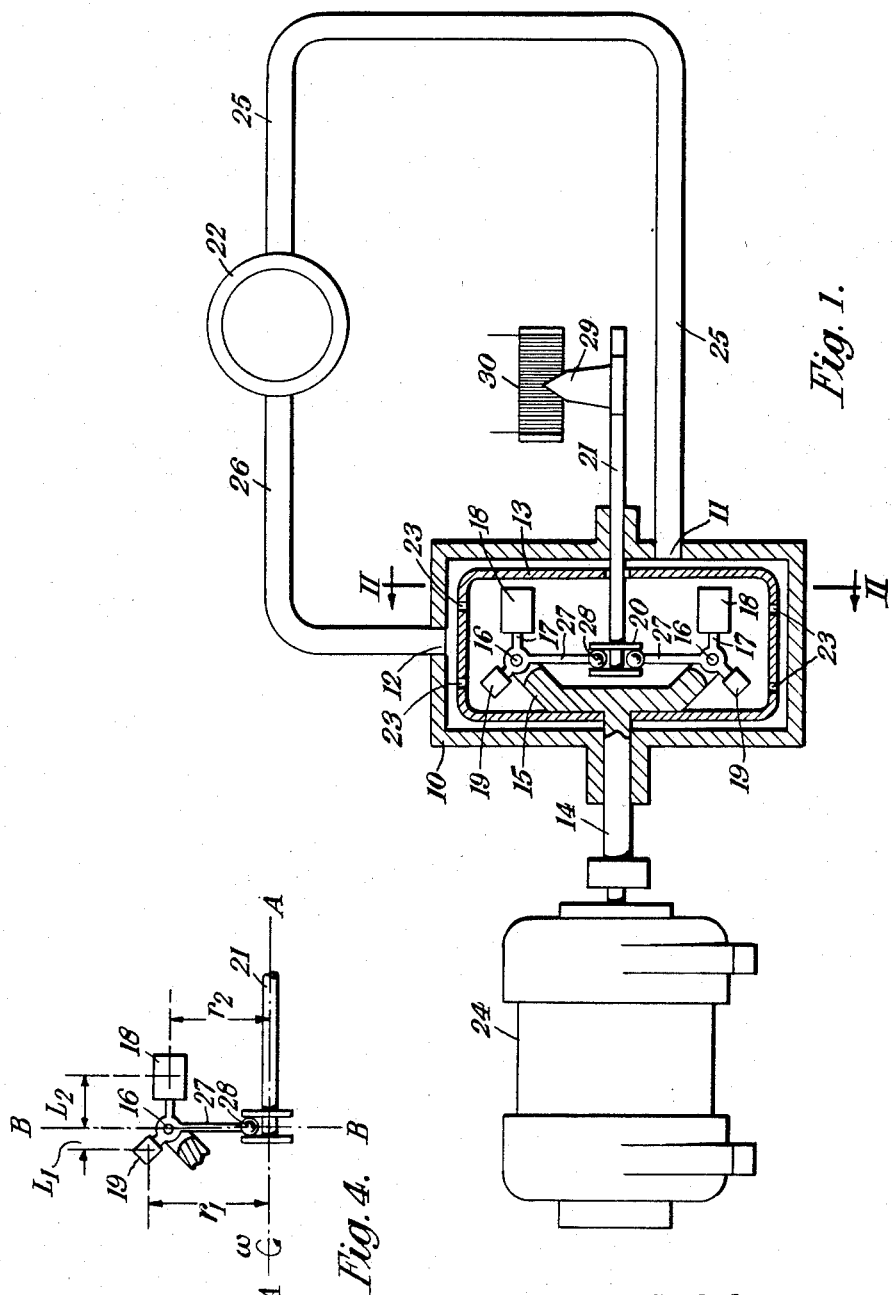
Fig. 1 is a vertical section through the first form of monitor.
Figure 2:
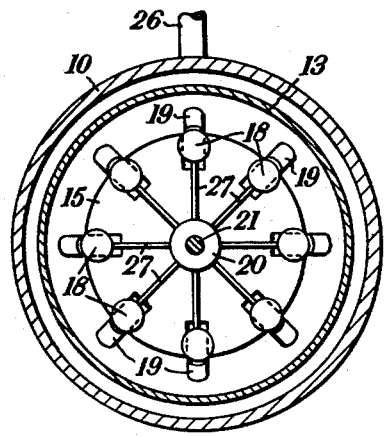
Fig. 2 is a section on the line II—II in Fig. 1.

In the arrangement shown in Figs. 1 and 2, the casing 10 of the monitor has an inlet 11 and an outlet 12, connected respectively by pipes 25 and 26 to a fuel main 22 supplying fuel to the engine of an aircraft. Within the casing 10 is a cylinder 13 fixed to driving shaft 14 which is rotated at high speed by an electric motor 24. Apertures 23 are provided in the cylinder to allow liquid to flow through the cylinder. Mounted within the cylinder 13 and also attached to the driving shaft 14 is a spider 15. Pivoted to the spider at 16 are eight identical cranked levers 17. One arm of each lever, which extends substantially parallel to the shaft 14, carries a weight 18 of a low density near to but greater than the maximum density of the liquid, e.g. of specific gravity 1.2 in the case of aircraft fuel. Another arm of each lever, which extends at about 45° to the shaft, carries a weight 19 of a substance of high density, e.g. of specific gravity 16, such as heavy metal. All of the pivoted axes 16 extend normally to the axis of the shaft 14 and are tangential to a common circle.

The moment of each composite mass 18, 19 about its pivotal axis 16 is such that, when immersed in a liquid having a density in the middle of the range it is desired to indicate, the system will be in equilibrium at the angles given above. It can be shown that there is a unique relationship between the angle of the system to the vertical and the density of the liquid.

Each of the levers 17 has a third arm 27 carrying a ball 28 coacting with a collar 20 on an axially movable rod 21 which extends out of the casing 10 through a suitable gland and is disposed coaxially with the shaft 14. The rod 21 carries a slider 29 coacting with a potentiometer 30, from which an electrical signal is obtained which is dependent on the axial position of the rod 21 and therefore on the density of the liquid.

The object of the cylinder 13 is to reduce the dynamic drag on the composite masses 18, 19. It does this by causing the liquid within the cylinder to rotate with the composite masses. Unless the cylinder 13 or some equivalent shield were provided, the composite masses would tend to act as a pump and accurate measurements of the density of the liquid would be impossible. The cylinder 13 does not entirely eliminate dynamic drag on the composite masses but reduces it to such a low value that it is of no consequence. Some small dynamic drag is inevitable because a flow of liquid through the cylinder, provided by the apertures 23, is necessary.

Figure 3:
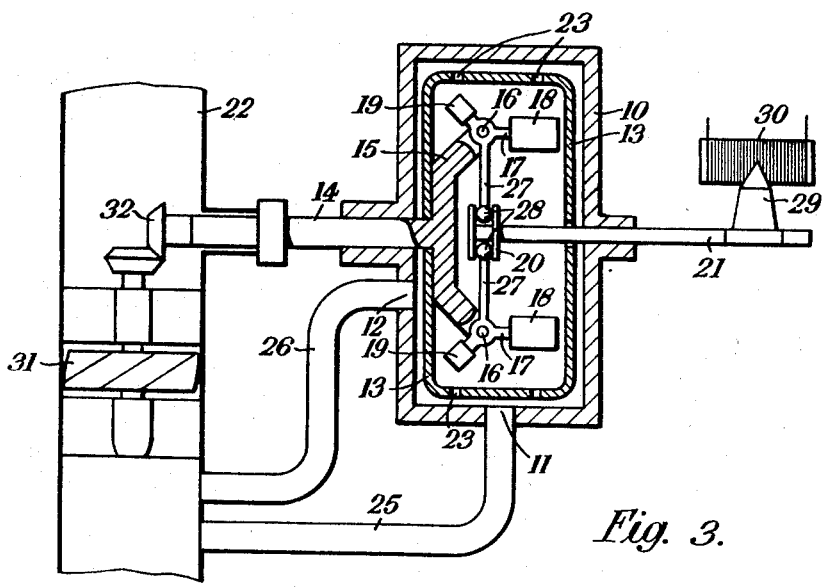
Fig. 3 is a vertical section through the second form of monitor.

The monitor shown in Fig. 3 is similar in all its essentials to that in Figs. 1 and 2 but the driving shaft 14 in this case is rotated by the passage of fuel through the main 22 by means of a turbine wheel 31 in the main and bevel gears 32.

The operation of the density monitor according to the invention will now be explained with reference to Fig. 4 which explains the conditions for equilibrium of one of the composite masses 18, 19. In Fig. 4, the line AA represents the axis of the driving shaft 14, Fig. 1, and the line BB is a line perpendicular to AA through the pivot 16 of the composite mass.

Assuming:

$g$ to be the acceleration due to gravity,
$V_1$ to be the volume of the mass 19 of greater density,
$V_2$ to be the volume of the mass 18 of lower density,
$d_1$ to be the density of the mass 19,
$d_2$ to be the density of the mass 18,
$d$ to be the density of the liquid,
$r_1$ to be the radial distance of the centre of gravity of mass 19 from the axis AA,
$r_2$ to be the radial distance of the centre of gravity of mass 18 from the axis AA,
$L_1$ and $L_2$ to be respectively the lengths of the perpendiculars to the line BB through the centres of gravity of the masses 19, 18,
$w$ to be the angular velocity of rotation of the shaft 14.

Then if the arms carrying the lighter masses 18 extend parallel to the axis AA, the system will be in equilibrium when the moments about the pivot 16 of the centrifugal forces acting on the masses 18, 19 are equal and opposite, i.e. when:

$$\frac{V_1(d_1-d)}{g}w^2r_1L_1=\frac{V_2(d_2-d)}{g}w^2r_2L_2$$

or $$V_1(d_1-d)r_1L_1=V_2(d_2-d)r_2L_2$$

These equations show that the equilibrium position of the composite masses is independent of the speed of rotation of the shaft 14 but will, provided $d_1$ and $d_2$ are different, vary with changes in the density of the liquid. It is also apparent that both masses 18, 19 must be of greater density than the liquid and that by appropriate selection of the volumes $V_1$, $V_2$ of the masses, having regard to their densities $d_1$, $d_2$ it can be arranged that the arms carrying the lighter masses 18 extend substantially parallel to the axis AA. As will be obvious, the centrifugal force acting on the elements 27, 28 then has no effect on the equilibrium of the system.

It will be appreciated that the density of the fuel being monitored will only vary slightly, e.g. in response to change in temperature, and that the arms carrying the masses 18 will only move slightly out of parallelism with the axis AA in response to such variation.

What I claim as my invention and desire to secure by Letters Patent is:

1. A centrifugal density monitor for indicating changes in density of a flowing liquid comprising a casing having an inlet and an outlet for the liquid, a driving member mounted for rotation in the casing and connected to a driving shaft, means for rotating the driving shaft, a plurality of composite masses which are immersed in the liquid when the casing is filled with liquid and are pivoted to the driving member about axes normal to that of the shaft, all the pivots being disposed in a common plane normal to the shaft and being tangential to a common circle and each composite mass comprising a cranked lever carrying on one arm a weight of low density and on the other arm a weight of high density, both of said weights being of greater density than the liquid, the weights being such that the arms carrying the lighter weights extend, when the driving member is rotating, in the same direction as and substantially parallel to the shaft and the other arms extend, when the driving member is rotating, away from the shaft at an angle of approximately 45°, an indicating device common to all the cranked levers for indicating common changes in inclination of the cranked levers with respect to the shaft and a shield in the casing constraining the liquid surrounding the composite masses to rotate therewith.

2. Apparatus according to claim 1, wherein the shield is a cylinder attached to the driving shaft and enclosing the composite masses, the cylinder having inlet and outlet apertures permitting liquid to flow through it.

3. Apparatus according to claim 1, wherein the low density weights have a density approximating to that of the liquid and the high density weights are of heavy metal.

4. Apparatus according to claim 1, in which the indicating device comprises a rod opposite and coaxial with the driving shaft and adapted to receive axial movement in relation to the casing from arms coacting with it and connected to the cranked levers.

5. Apparatus according to claim 1, in which the indicating device includes an electrical potentiometer and a cooperating slider arranged to receive relative movement in response to changes in density of the liquid.

6. The combination, with a fuel main for supplying fuel to an aircraft engine, of a centrifugal density monitor as claimed in claim 1 and inlet and outlet pipes respectively connecting the fuel main to the inlet and outlet of the casing of said density monitor.

7. A combination as claimed in claim 6, wherein the means for rotating the driving shaft of the density monitor is a turbine in said fuel main and gearing connecting said turbine to said driving shaft.

8. A centrifugal monitor responsive to changes in density of a flowing liquid, comprising a casing having an inlet and an outlet for the liquid, a driving shaft extending into the casing, means for rotating said driving shaft, a plurality of pairs of masses of different density in the casing which are mounted on the driving shaft for rotation therewith, each of said pairs of masses being independently pivoted to said shaft, each mass of each pair being rigidly connected to the other mass of the pair for movement about the pivot as a cranked lever for rotation about an axis normal to the axis of the shaft, and the masses of each pair being of higher density than the liquid and being so disposed in relation to their pivot that the centrifugal forces on the two masses act in opposite directions about the pivot and cause the pair of masses to assume an equilibrium position dependent upon the density of the liquid flowing through said casing, all of said pairs of masses being identical and all of said pivots being equidistant from said shaft, a shield in the casing constraining the liquid surrounding the masses to rotate therewith and a member coupled to all of the masses and arranged to move progressively, in response to changes in the equilibrium position of the masses, to positions representative of the density of the liquid.

References Cited in the file of this patent

UNITED STATES PATENTS 2,664,742   MacDonald _____ Jan. 5, 1954